Figure 1:
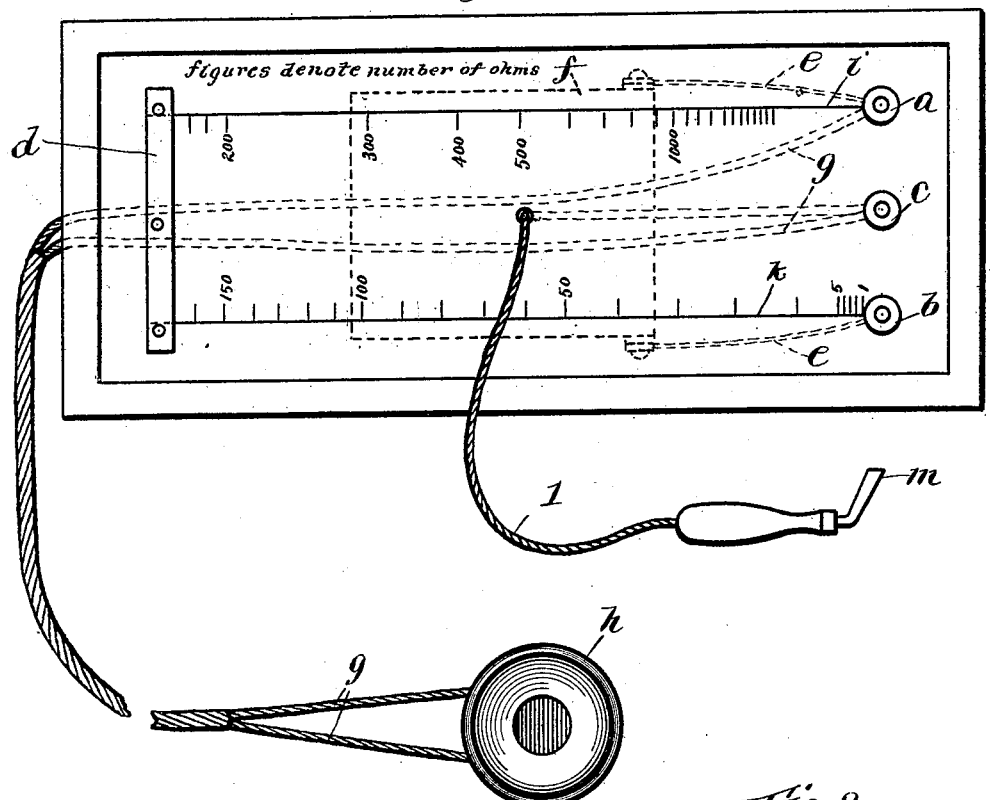

No. 683,622. Patented Oct. 1, 1901.
H. O. RUGH.
ELECTRICAL MEASURING INSTRUMENT.
(Application filed July 24, 1901.)

(No Model.)

Witnesses:
Harvey L. Hanson.
John Stahr.

Inventor:
Harry O. Rugh.
by Charles A. Brown, Gregg Belfield Attys.

THE NORRIS PETERS CO., PHOTO-LITHO., WASHINGTON, D. C.

UNITED STATES PATENT OFFICE.

HARRY O. RUGH, OF SANDWICH, ILLINOIS.

ELECTRICAL MEASURING INSTRUMENT.

SPECIFICATION forming part of Letters Patent No. 683,622, dated October 1, 1901.

Application filed July 24, 1901. Serial No. 69,521. (No model.)

*To all whom it may concern:*

Be it known that I, HARRY O. RUGH, a citizen of the United States, residing at Sandwich, in the county of Dekalb and State of Illinois, have invented a certain new and useful Improvement in Electrical Measuring Instruments, (Case No. 1,) of which the following is a full, clear, concise, and exact description, reference being had to the accompanying drawings, forming a part of this specification.

My invention relates to electrical measuring instruments, and more particularly to that class of instruments employed in determining the resistance of electrical conductors.

My invention is an improvement upon Wheatstone or electric bridges, and has for its object the reduction in the number of instrumentalities that have usually been employed in operating apparatus of this class. The Wheatstone bridge, as is well understood, comprises a battery whose terminals are connected to main binding-posts, there being also two supplemental binding-posts each united with the main binding-post and themselves directly connected by a conductor, including the testing instrument. Each of the four conductors uniting the supplemental binding-posts with the main binding-posts contains resistance, one conductor being that whose resistance is to be determined, the other resistances being known. One of these resistances possesses an absolute or fixed value, while the relative values of the remaining known resistances are adjustably determined. There are thus provided two instruments possessing fixed resistances, one of the instruments being included in one of the conductors uniting a main and supplemental binding-post, while the other instrument is provided in the conductor that directly unites the supplemental binding-posts.

It is the object of my invention to dispense with one of these instruments, and for that purpose the instrument or resistance included in the conductor uniting a main and supplemental binding-post is constructed to act in an added capacity—that of an indicator—while the indicator that is included in the conductor directly uniting the supplemental binding-posts may be totally eliminated from the circuit.

In combination with this apparatus I preferably employ an instrument serving to determine the relative lengths of the two sides of the Wheatstone bridge that neither contain the testing instrument nor the device of unknown resistance, these conductors for the purpose being preferably in the form of German-silver wire possessing high resistance. The diagonal conductor, which in the former type of bridges permanently united the supplemental binding-posts, is preferably connected with but one of these binding-posts and is provided at its other terminal with a blade contact for ready engagement with any portion of the German-silver conductor.

I will explain my invention more fully by reference to the accompanying drawings, in which—

Figure 2:
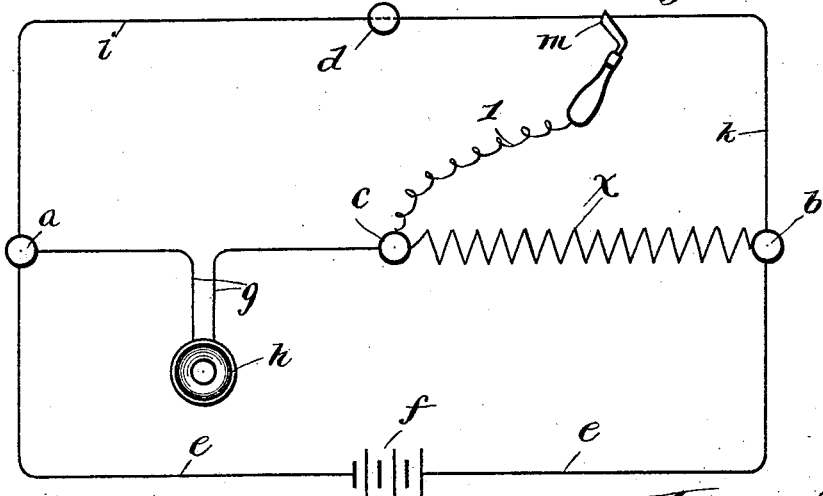

Figure 1 is a plan view of an instrument constructed in accordance with the invention, certain circuit connections being indicated in dotted lines. Fig. 2 is a simplified diagrammatic view to illustrate more clearly the principle of operation of the instrument.

Like parts are indicated by similar characters of reference throughout both views.

The instrument is provided with two main binding-posts or terminals $a$ $b$ and two supplemental binding-posts or terminals $c$ $d$. The main binding-posts $a$ $b$ are directly united by a conductor $e$, including a source of current in the form of a battery $f$. The binding-posts $a$ and $c$ are united by a conductor $g$, including a testing instrument, preferably in the form of a head-telephone $h$, while the binding-posts $b$ and $c$ are adapted for connection with the terminals of the conductor whose resistance is to be determined, a device $x$ of unknown resistance being indicated in this connection. The binding-posts $a$ and $d$ and $b$ and $d$ are united, respectively, by conductors $i$ and $k$, formed, preferably, of German silver of, say, twenty-five ohms resistance in the aggregate, equally divided between the two conductors. These conductors $i$ and $k$ thus constitute two sides of the bridge opposed to the conductors $g$ and $x$, the remaining sides of the bridge, these four conductors thus constituting a circuit in the form of a quadrilateral. The diagonal $l$ of this quadrilateral is preferably adjustable, being adapted for connection with any portion of the conductor $i$ or the conductor $k$. The diagonal $l$ is fixedly attached to the binding-post $c$ and is provided at its other end with a contact-blade $m$, constituting a stylus, which may be readily engaged with any portion of the conductor $i$ or $k$, whereby the resistance between the main binding-post $a$ and the blade $m$ and the said blade and binding-post $b$ may be relatively determined. The diagonal $l$ is preferably free of any indicating device, and its resistance is preferably very low, though I do not wish to be limited to this feature. Each of the sides of the quadrilateral thus contains resistance, two of the sides $i$ and $k$ having their resistance relatively adjustable, the third side $g$ having its resistance fixed, while the fourth side, between the posts $b$ and $c$, contains the conductor whose resistance is to be determined. The resistance $h$ in addition to its passive function is also active in determining the unknown resistance of the conductor under test. The most effective form of test instrument is a telephone-receiver. In the operation of the apparatus the contact-blade $m$ is shifted over the conductors $i$ and $k$ until that point is reached at which the receiver-diaphragm is not actuated.

The method of operation may be described as follows: If it be supposed that the blade or shifting contact $m$ is brought into engagement with the binding-post $a$, the amount of current through the telephone-receiver or indicator will be decreased upon each application of the said contact to the said binding-post, the resistance of the conductor $l$ being preferably negligible, while if said contact or stylus $m$ is touched to the post $b$ the resistance, including the telephone-receiver and the conductor of unknown resistance, will be decreased, thereby permitting an increase of the current flowing through the telephone-receiver. Between these two extremes a point is selected by successive applications of the stylus to the wire $i\,k$ where the current through the receiver does not vary upon application and removal of the stylus, this point being termed the "point of silence." Thus more or less of the wire $i\,k$ is included in shunt of the receiver and the conductor under test in determining the resistance of said conductor. In actual practice the wire $i\,k$ is subdivided into sections, as indicated in Fig. 1, though it is obvious that these two sections may be joined into a single wire, as diagrammatically indicated in Fig. 2.

In the construction of the device the instrument is calibrated by the inclusion of resistances of different known values between the binding-posts $b$ and $c$, and the various points of silence corresponding to the various resistances are marked, as indicated in the drawings, along the conductors $i$ and $k$, which for the purpose are preferably straight. When, therefore, an unknown resistance is inserted between the posts $b$ and $c$, the point of silence corresponding to this resistance may readily be determined, which, coinciding with a point of silence located with the previous known resistance, furnishes to the tester a measurement of the resistance of the conductor under test. In other words, the stylus end is moved along the wire $i\,k$ to such a point where the shunt about the telephone comprising the said wire $i\,k$, the blade $m$, and the conductor $l$ is of a resistance that will not cause a variation of the current flowing through the receiver. Current constantly flows through the receiver, and when the shunt-circuit established by the contact of the blade $m$ with the wire $i\,k$ has too much or too little resistance the current through the receiver will be varied. A point may be selected along the wire $i\,k$ for engagement with the blade $m$ which will cause the said shunt to be neither of too much nor too little resistance, but exactly the right resistance to prevent a variation of current in the receiver. This is the point of silence. It is of course the variation in the current that causes the operation of the receiver.

While I have herein shown and particularly described the preferred embodiment of my invention, it is obvious that changes may readily be made without departing from the spirit thereof, and I do not therefore wish to be limited to the precise disclosure herein set forth; but,

Having thus described my invention, I claim as new and desire to secure by Letters Patent—

1. The combination with a source of current, of three sides of a quadrilateral circuit adapted to receive current from the said source, the fourth side of the said quadrilateral being the conductor whose resistance is to be determined, a test-indicating instrument included in one of the sides of the quadrilateral, and a conductor $l$ for inclusion in connection with the remaining two of the three permanently-provided sides of the quadrilateral and in shunt of the test-indicating instrument and the conductor of unknown resistance, substantially as described.

2. The combination with a source of current, of three sides of a quadrilateral circuit adapted to receive current from the said source, the fourth side of the said quadrilateral being the conductor whose resistance is to be determined, a test-indicating instrument included in one of the sides of the quadrilateral, and a conductor $l$ for inclusion in connection with the remaining two of the three permanently-provided sides of the quadrilateral and in shunt of the test-indicating instrument and the conductor of unknown resistance, the test-indicating instrument and the conductor of unknown resistance being adapted for series connection with each other, while the remaining two sides of the quadrilateral are also in series with each other, the said source of current being in parallel with the path including the test-indicating instrument and the conductor of unknown resistance and also in parallel with the remaining two sides of the quadrilateral conductor together, while the said conductor $l$ is connected at one end between the test-indicating instrument and the conductor of unknown resistance, substantially as described.

3. The combination with a source of current, of terminals $a$, $b$, thereof, a terminal $c$, the terminals $b$ and $c$ being adapted for connection with the terminals of the conductor of unknown resistance, a test-indicating instrument $h$ interposed between the terminals $a$ and $c$, resistance-wire $i$, $k$, uniting the terminals $a$ and $b$, the source of current being included in parallel with the current-path including the test-indicating instrument and the conductor of unknown resistance in series, and also in parallel with the wire $i$, $k$, and a conductor $l$ attached at one end to the terminal $c$ and provided at the other end with a stylus $m$ adapted to make contact with any portion of the wire $i$, $k$, whereby the amount of resistance in shunt of the test-indicating instrument and the conductor of unknown resistance may be adjusted to determine the amount of the unknown resistance in the conductor under test, substantially as described.

4. The combination with a source of current, of terminals $a$ and $b$ thereof, a terminal $c$, the terminals $b$ and $c$ being adapted for connection with the terminals of the conductor of unknown resistance, a test-indicating telephone-receiver $h$ interposed between the terminals $a$ and $c$, resistance-wire $i$, $k$, uniting the terminals $a$ and $b$, the source of current being included in parallel with the current-path including the test-indicating telephone and the conductor of unknown resistance in series, and also in parallel with the wire $i$, $k$, and a conductor $l$ attached at one end to the terminal $c$ and provided at the other end with a stylus $m$ adapted to make contact with any portion of the wire $i$, $k$, whereby the amount of resistance in shunt of the test-indicating telephone and the conductor of unknown resistance may be adjusted to determine the amount of the unknown resistance in the conductor under test, substantially as described.

5. The combination with a source of current, of terminals $a$, $b$, thereof, a terminal $c$, the terminals $b$ and $c$ being adapted for connection with the terminals of the conductor of unknown resistance, a test-indicating instrument $h$ interposed between the terminals $a$ and $c$, resistance-wire $i$, $k$, uniting the terminals $a$ and $b$, the source of current being included in parallel with the current-path including the test-indicating instrument and the conductor of unknown resistance in series, and also in parallel with the wire $i$, $k$, a conductor $l$ attached at one end to the terminal $c$ and provided at the other end with a stylus $m$ adapted to make contact with any portion of the wire $i$, $k$, whereby the amount of resistance in shunt of the test-indicating instrument and the conductor of unknown resistance may be adjusted to determine the amount of the unknown resistance in the conductor under test, and a calibrated scale along the wire $i$, $k$, for indicating the measurement of the resistance of the conductor under test, substantially as described.

6. The combination with a source of current, of terminals $a$ and $b$ thereof, a terminal $c$, the terminals $b$ and $c$ being adapted for connection with the terminals of the conductor of unknown resistance, a test-indicating telephone-receiver $h$ interposed between the terminals $a$ and $c$, resistance-wire $i$, $k$, uniting the terminals $a$ and $b$, the source of current being included in parallel with the current-path including the test-indicating telephone and the conductor of unknown resistance in series, and also in parallel with the wire $i$, $k$, a conductor $l$ attached at one end to the terminal $c$ and provided at the other end with a stylus $m$ adapted to make contact with any portion of the wire $i$, $k$, whereby the amount of resistance in shunt of the test-indicating telephone and the conductor of unknown resistance may be adjusted to determine the amount of the unknown resistance in the conductor under test, and a calibrated scale along the wire $i$, $k$, for indicating the measurement of the resistance of the conductor under test, substantially as described.

In witness whereof I hereunto subscribe my name this 17th day of July, A. D. 1901.

HARRY O. RUGH.

Witnesses:
FRED B. PATTEN,
GEORGE L. CRAGG.